United States Patent
Du et al.

(10) Patent No.: US 10,267,627 B2
(45) Date of Patent: Apr. 23, 2019

(54) MULTI-LINE ARRAY LASER THREE-DIMENSIONAL SCANNING SYSTEM, AND MULTI-LINE ARRAY LASER THREE-DIMENSIONAL SCANNING METHOD

(71) Applicant: TENYOUN 3D (TIANJIN)TECHNOLOGY CO., LTD, Tianjin (CN)

(72) Inventors: Hua Du, Beijing (CN); Renju Li, Singapore (SG); Chengwei Ye, Beijing (CN)

(73) Assignee: TENYOUN 3D (TIANJIN) TECHNOLOGY CO., LTD, Tianjin (CN)

(*) Notice: Subject to any disclaimer, the term of this patent is extended or adjusted under 35 U.S.C. 154(b) by 0 days.

(21) Appl. No.: 15/741,238

(22) PCT Filed: Jan. 28, 2016

(86) PCT No.: PCT/CN2016/072451
§ 371 (c)(1),
(2) Date: Dec. 29, 2017

(87) PCT Pub. No.: WO2017/041419
PCT Pub. Date: Mar. 16, 2017

(65) Prior Publication Data
US 2018/0180408 A1    Jun. 28, 2018

(30) Foreign Application Priority Data
Sep. 10, 2015  (CN) .......................... 2015 1 0574982

(51) Int. Cl.
*G01B 11/25* (2006.01)

(52) U.S. Cl.
CPC .......... *G01B 11/2545* (2013.01); *G01B 11/25* (2013.01); *G01B 11/2513* (2013.01); *G01B 11/2518* (2013.01); *G01B 11/2522* (2013.01)

(58) Field of Classification Search
CPC ..... G01B 11/002; G01B 11/16; G01B 11/167; G01B 11/22; G01B 11/24; G01B 11/2408;
(Continued)

(56) References Cited

U.S. PATENT DOCUMENTS 9,903,934 B2 *  2/2018 Antoina .................. G01S 3/786
9,909,855 B2 *  3/2018 Becker ................. G01B 11/002
(Continued)

FOREIGN PATENT DOCUMENTS

CN     1483999 A     3/2004
CN     102607462 A   7/2012
(Continued)

OTHER PUBLICATIONS

State IP Office of P.R. China, PCT International Search Report for PCT Counterpart Application No. PCT/CN2016/072451, 4 pp. (including English translation), (dated May 27, 2016).
(Continued)

*Primary Examiner* — Gordon J Stock, Jr.
(74) *Attorney, Agent, or Firm* — Womble Bond Dickinson (US) LLP

(57) ABSTRACT

The present invention provides a multi-line array laser three-dimensional scanning system and a multi-line array laser three-dimensional scanning method, the system performs precise synchronization and logic control of the multi-line array laser three-dimensional scanning system by a programmable gate array FPGA; employs a line laser array as the projection pattern light source, sends trigger signals to a stereoscopic image sensor, a inertial sensor and a line laser
(Continued)

array by FPGA; wherein a upper computer receives image pairs taken by the stereoscopic image sensor, and codes, decodes as well as performs a three-dimensional reconstruction for the laser line array patterns in the image pairs, performs a three-dimensional reconstruction for the feature points on the surface of the measured object, and matches and aligns the three-dimensional feature points at different times; the system predicts and corrects the matching calculation by employing a hybrid sensing technology, which registers and stitches the time domain laser three-dimensional scanning data, meanwhile evaluates the error level in real time and feeds it back to an error feedback controller to obtain an adjustment instruction. Thereby the system performs a laser three-dimensional scanning with low cost, high efficiency, high reliability and high accuracy.

13 Claims, 5 Drawing Sheets

(58) Field of Classification Search
CPC ............ G01B 11/2416; G01B 11/2425; G01B 11/245; G01B 11/25; G01B 11/2504; G01B 11/2509; G01B 11/2514; G01B 11/2522; G01B 11/2527; G01B 11/2531; G01B 11/2536; G01B 11/254; G01B 11/2545

USPC .................................................. 356/601–613
See application file for complete search history.

(56) References Cited

U.S. PATENT DOCUMENTS

| 9,964,398 | B2* | 5/2018 | Becker ................. G01B 11/005 |
| 2016/0227193 | A1* | 8/2016 | Osterwood ............. G01S 17/42 |
| 2016/0323565 | A1* | 11/2016 | van Baarsen ........... G06T 7/593 |
| 2016/0335778 | A1* | 11/2016 | Smits ........................ G01P 3/36 |
| 2017/0019659 | A1* | 1/2017 | Xiang ................ H04N 13/0296 |

FOREIGN PATENT DOCUMENTS

| CN | 103608696 A | 2/2014 |
| CN | 105203046 A | 12/2015 |
| CN | 105222724 A | 1/2016 |
| KR | 20140125538 A | 10/2014 |

OTHER PUBLICATIONS

State IP Office of P.R. China, PCT Written Opinion of the International Searching Authority for PCT Counterpart Application No. PCT/CN2016/072451, 5 pp., (dated May 27, 2016).

* cited by examiner

MULTI-LINE ARRAY LASER THREE-DIMENSIONAL SCANNING SYSTEM, AND MULTI-LINE ARRAY LASER THREE-DIMENSIONAL SCANNING METHOD

CROSS-REFERENCE TO RELATED APPLICATIONS

This patent application is a US. National Phase Application under 35 U.S.C § 371 of International Application No. PCT/CN2016/072451, filed on 28 Jan. 2015, entitled MULTI-LINE ARRAY LASER THREE-DIMENSIONAL SCANNING SYSTEM, AND MULTI-LINE ARRAY LASER THREE-DIMENSIONAL SCANNING METHOD, which claims the benefit of priority of Chinese patent application No. 201510574982.X, filed 10 Sep. 2015.

TECHNICAL FIELD

The present invention relates to the technical field of three-dimensional scanning of the surface geometry of an object, and more particularly, to a multi-line array laser three-dimensional scanning system and multi-line array laser three-dimensional scanning method.

BACKGROUND

In recent years, three-dimensional scanning, as a rapid three-dimensional digital technology, has been applied increasingly in various fields, including reverse engineering, industrial testing, computer vision, CG production, etc., especially in the fields of 3D printing and intelligent manufacturing, which are currently developing rapidly. Three-dimensional scanning, as a front-end three-dimensional digital and three-dimensional visual sensing technology, has become an important segment of the industrial chain; meanwhile, various types of applications have demanded higher requirements in numerous aspects of the three-dimensional scanning device, such as cost, practicality, accuracy and reliability, etc.

Optical three-dimensional scanning is the most common modern technical means in the field of three-dimensional digitization, and it is the prominent feature of the technology for having both relatively high measurement efficiency and high precision. White light three-dimensional scanning is a conventional optical scanning technology, where a coding mark is made on the surface of an object by grating projection and then a triangulation is made by photographing of a camera. Being widely applied in the field of three-dimensional measurement, white light three-dimensional scanning is characterized by high precision, high spatial resolution and relatively fine data quality. With the continuous expansion of the application field, various complex utilization environments have brought forward new requirements on three-dimensional scanning technology. For example, it is expected that the device have a better scanning convenience and better optical anti-interference performance, and that the scanning process can be more rapid and simple, and unnecessary steps could be omitted as much as possible, and the measurement can be completed in the majority of light environments. Due to the grating projector structure and the limitation of relying on sequential coding, white light scanning device is large in volume and weight, and needs stable support structures such as tripod to assist measurement, thereby limiting the convenience of measuring; additionally, since the luminance of white light sources is limited, the measurement is considerably influenced by ambient lights and optical properties such as the color and material of the object, it is difficult to measure effectively in a brighter environment or on darker objects.

In order to make up for the shortcomings of white light three-dimensional scanning technology, a scanning technology with line laser as light source emerges. Although still based on the triangulation principle of multi-vision, this technology is different in that the line laser is employed as pattern projector, the patterns are simple and do not change over time, the laser is small and simple in structure; accordingly, the scanning device becomes light and does not need additional support and stabilization device to assist measuring, therefore hand-held measurement as its typical characteristic is capable; meanwhile, the luminance in the center of the laser line is extremely high, thus adaptable to scanning in the majority of light environments or on dark objects. However, before the existing laser three-dimensional scanning technology pervades the entire field of three-dimensional scanning, there are still several significant problems to be solved:

The scan efficiency and cost advantages cannot be achieved both. Single-line laser scanning technology is relatively simple in realization, and low in cost, while its scanning performance is greatly limited, and its scanning speed is slow, leading to limited practicality; whereas multi-line laser scanning technology is largely improved in scanning speed, but due to the reliance on special customized laser generator, its process is complex and its cost is high, thereby also hindering the popularization of applying the technology.

The service life is short. Continuous full-power scanning expedites the light attenuation for optic devices, particularly for various types of optical elements (laser LD and LED lights, etc.), which directly leads to a degraded scanning performance (including data quality and scanning speed); additionally, a lot of heat generated by the continuously working LEDs also brings in cooling problems for the device, since good heat dissipation performance contradicts with small and light overall structure, and poor heat dissipation performance not only causes early failure of the optical elements, but also results in a small deformation in the entire scanning structure, leading to a loss of scanning accuracy.

The scanning mismatching rate is high, and lacks of reliability. There is a high mismatching rate in the conventional marker-based matching technology, which is presented that multi-scanned data appear ambiguity when uniformly registered to the same coordinate system, leading to a piece of scanning data being separated from the whole data, thus generating a wrong model. This problem can be solved in the white light three-dimensional scanning process by manually deleting etc. after each single-side scanning, but cannot be solved by employing similar methods in the laser three-dimensional scanning process under a continuous scanning mode. Thus, there is usually a re-scanning after a mismatching occurs, which remarkably affects the working efficiency.

The scanning accuracy is low. The quality of laser scanning data is related to a variety of factors, wherein working distance control is a major factor. Under the circumstance that the depth of field is determined, an image blurring may be caused when the change of working distance goes beyond the depth of field, which results in large data noise and significant accuracy reduction. In the conventional laser scanning technology, working distance mainly relies on an operator's subjective evaluation. Therefore, it is difficult to precisely control the working distance in continuous scanning process, leading to a relatively low scanning accuracy.

SUMMARY

With respect to the defects in the prior art, the present invention provides a multi-line array laser three-dimensional scanning system and a multi-line array laser three-dimensional scanning method, so as to solve the technical problems above.

In the first aspect, the present invention provides a multi-line array laser three-dimensional scanning system, comprising: a multi-line array laser three-dimensional scanning device, comprising a programmable gate array FPGA, at least one stereoscopic image sensor, an inertial sensor, a line laser array and an error feedback controller, the programmable gate array FPGA being coupled with the stereoscopic image sensor, inertial sensor, line laser array and error feedback controller, respectively; and an upper computer coupled with the programmable gate array, stereoscopic image sensor and inertial sensor, respectively;

the programmable gate array FPGA is configured to send a first trigger signal to the line laser array, such that the line laser array illuminates the surface of a measured object with stroboflash according to the first trigger signal;

the programmable gate array FPGA is also used to send a second trigger signal to the stereoscopic image sensor, such that the stereoscopic image sensor performs exposure shootings to the measured object according to the second trigger signal, and sends the image pairs that are taken to the upper computer;

the programmable gate array FPGA is also used to send a third trigger signal to the inertial sensor, such that the inertial sensor sends the location information of the multi-line array laser three-dimensional scanning device to the upper computer according to the third trigger signal;

the upper computer is also used to perform a real-time error evaluation for measured data and feed the evaluation result back to the programmable gate array FPGA;

the programmable gate array FPGA is also used to send a control signal to the error feedback controller according to the evaluation result, and adjust the distance between the laser three-dimensional scanning device and the measured object according to the evaluation result, after receiving the evaluation result fed back by the upper computer;

the upper computer is used to code and decode the laser lines in the image pairs taken by the stereoscopic image sensor;

the upper computer is also used to make a three-dimensional reconstruction for the feature points in the image pairs of the measured object and the laser lines reflected by the surface of the measured object;

the upper computer is also used to register data of the three-dimensional laser lines in different frames into the same coordinate system to generate a shape-plane-point cloud based on the location information and the feature points returned by the inertial sensor.

Alternatively, the programmable gate array FPGA is further configured to receive a preset pulse trigger signal and a preset exposure time sent by the upper computer, and send the first trigger signal to the line laser array and send the third trigger signal to the inertial sensor respectively according to the preset pulse trigger signal, and send the second trigger signal to the stereoscopic image sensor according to the preset exposure time.

Alternatively, the error feedback controller is configured to receive the control signal sent by the programmable gate array FPGA, and output an indicator light corresponding to the control signal.

Alternatively, the error feedback controller is a color changing LED light including the lights combined by three primary colors of red, green and blue.

Alternatively, the stereoscopic image sensor is a multi-vision image sensor composed of two or more optical cameras.

Alternatively, the stereoscopic vision sensor is provided with an illumination device.

Alternatively, the illumination time of the illumination device is synchronized with the exposure time of the stereoscopic sensor.

Alternatively, the line laser array comprises a plurality of line lasers arranged in a matrix arrangement.

Alternatively, the upper computer is configured to track the feature points, and register the data of the three-dimensional laser lines in different frames into the same coordinate system by tracking the homonymous feature points between adjacent time frames.

Alternatively, the upper computer is further configured to evaluate the distance between the laser three-dimensional scanning device and the measured object in realtime, and feed the evaluation result back to the programmable gate array FPGA when the distance exceeds the preset distance.

Alternatively, the upper computer is also provided with a communication interface used to communicate with a control device coupled with the upper computer, such that the control device adjusts the distance between the multi-line array laser three-dimensional scanning device and the measured object.

In the second aspect, the present invention also provides a multi-line array laser three-dimensional scanning method based on the multi-line array laser three-dimensional scanning system above, comprising:

the programmable gate array FPGA sending a first trigger signal to the line laser array, such that the line laser array illuminates the surface of a measured object with stroboflash according to the first trigger signal;

the programmable gate array FPGA sending a second trigger signal to the stereoscopic image sensor, such that the stereoscopic image sensor exposes the measured object according to the second trigger signal and sends the images taken to the upper computer;

the upper computer coding and decoding the laser lines reflected by the surface of the measured object in the image pairs taken by the stereoscopic image sensor;

the upper computer making a three-dimensional reconstruction for the feature points of the measured object in the image pairs taken by the stereoscopic image sensor and the laser lines reflected by the surface of the measured object;

the upper computer registering data of the three-dimensional laser lines in different frames into the same coordinate system to generate a shape-plane-point cloud based on the location information and the feature points returned by the inertial sensor.

The upper computer evaluating the error for measured data in real time and feeding the evaluation result back to the programmable gate array FPGA;

the programmable gate array FPGA sending a control signal to the error feedback controller and adjusting the distance between the laser three-dimensional scanning device and the measured object according to the evaluation result after receiving the evaluation result fed back by the upper computer.

Alternatively, before the programmable gate array FPGA sending the first trigger signal to the line laser array, the method further comprises:

the programmable gate array FPGA receiving a preset exposure time and a preset pulse trigger signal sent by the upper computer, sending the first trigger signal to the line laser array and transmit the third trigger signal to the inertial sensor respectively according to the preset pulse trigger signal, and sending the second trigger signal to the stereoscopic image sensor according to the preset exposure time.

It can be known from the technical solutions above that, the present invention provides a multi-line array laser three-dimensional scanning system and a multi-line array laser three-dimensional scanning method, the system realizes precise synchronization and logic control of the multi-line array laser three-dimensional scanning system by a programmable gate array FPGA; employs a line laser array as the projection pattern light source, sends trigger signals to a stereoscopic image sensor, a inertial sensor and a line laser array by the programmable gate array FPGA, enabling an upper computer to receive image pairs taken by the stereoscopic image sensor, and code, decode as well as make a three-dimensional reconstruction for the laser line array patterns in the image pairs, make a three-dimensional reconstruction for the feature points on the surface of the measured object and match and align the three-dimensional feature points at different times; predicts and corrects the matching calculation by employing a hybrid sensing technology, which is for registering and stitching the time domain laser three-dimensional scanning data; meanwhile evaluates the error level in real time and feeds it back to an error feedback controller to make an adjustment instruction. Thereby the system accomplishes a laser three-dimensional scanning with low cost, high efficiency, high reliability and high accuracy.

BRIEF DESCRIPTION OF THE DRAWINGS

In order to more clearly explain the embodiments of the present invention or the technical solutions in the prior art, a simple introduction will be made for the drawings required in describing the embodiments or the prior art. It will be apparent to those of ordinary skills in the art that the drawings in the following description are only some embodiments of the present invention, and other drawings may be obtained from these drawings without paying creative work.

DETAILED DESCRIPTION

The technical solutions in the embodiments of the present invention will be described clearly and fully hereinafter by combining the drawings in the embodiments of the present invention. It is apparent that the described embodiments are not all but only a part of the embodiments of the present invention. Based on the embodiments of the present invention, all other embodiments obtained by those of ordinary skills in the art without creative work, are within the scope of the present invention.

Figure 1:
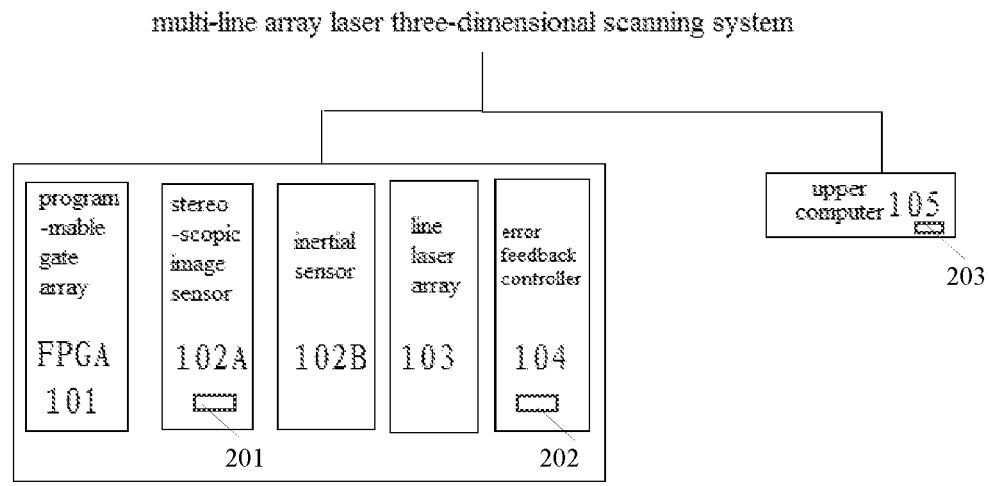
FIG. 1 is a structural schematic diagram of a multi-line array laser three-dimensional scanning system provided by an embodiment of the present invention.

Firstly, the multi-line array laser three-dimensional scanning system of the present application is described as illustrated in FIG. 1, wherein the system comprises a programmable gate array FPGA, at least one stereoscopic image sensor, an inertial sensor, a line laser array, an error feedback controller and an upper computer, wherein the upper computer can be interpreted as a control device, for example, a master computer. The upper computer has functions of laser line coding and decoding, three-dimensional reconstruction, hybrid sensor locating and error evaluation and calculation.

The present invention realizes precise synchronization and logic control of the multi-line array laser three-dimensional scanning system by a programmable gate array FPGA, employs group line laser arrays as the projection pattern light sources, marks and identifies the laser lines with multiple laser line coding and decoding unit, predicts and corrects the locating and registration of dynamic feature points with hybrid sensor locating technology, evaluates the measurement error levels in real time and feeds it back to the hardware system to make adjustment instructions, thereby the present invention accomplishes a laser three-dimensional scanning with low cost, high efficiency, high reliability and high accuracy.

Figure 2:
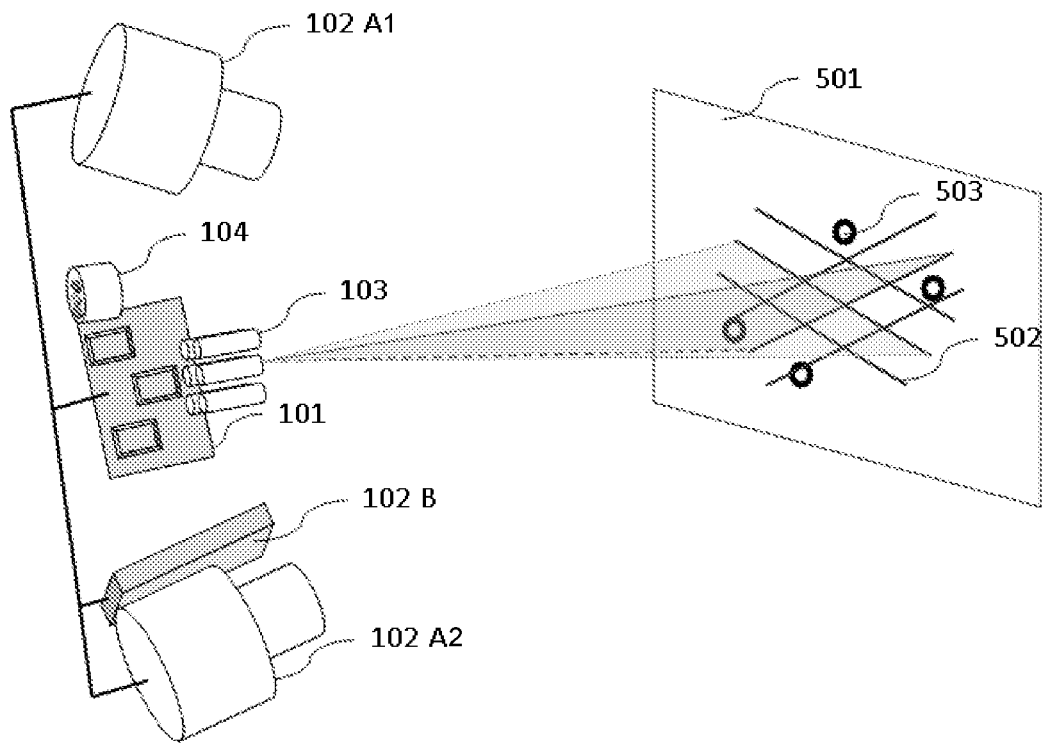
FIG. 2 is a structural schematic diagram of a multi-line array laser three-dimensional scanning device provided by an embodiment of the present invention.

What are included in the multi-line array laser three-dimensional scanning system comprises: a multi-line array laser three-dimensional scanning device and an upper computer, as illustrated in FIG. 2. The multi-line array laser three-dimensional scanning device comprises a programmable gate array FPGA 101, at least one stereoscopic image sensor 102A, an inertial sensor 102B and a line laser array 103; the programmable gate array FPGA 101 is coupled with the stereoscopic image sensor 102A, inertial sensor 102B, line laser array 103 and error feedback controller 104 respectively, the upper computer 105 is coupled with the programmable gate array FPGA 101, stereoscopic image sensor 102A and inertial sensor 102B respectively;

the programmable gate array FPGA 101 is configured to send a first trigger signal to the line laser array 103, such that the line laser array 103 illuminates the surface of the measured object with stroboflash according to the first trigger signal;

the programmable gate array FPGA 101 is also used to send a second trigger signal to the stereoscopic image sensor 102A, such that the stereoscopic image sensor 102A performs exposure shootings to the measured object according to the second trigger signal, and sends the image pairs that are taken to the upper computer;

the programmable gate array FPGA 101 is also used to send a third trigger signal to the inertial sensor 102B, such that the inertial sensor 102B sends the location information of the multi-line array laser three-dimensional scanning device to the upper computer according to the third trigger signal;

the upper computer 105 is also used to perform a real-time error evaluation for measured data and feed the evaluation result back to the programmable gate array FPGA 101;

the programmable gate array FPGA 101 is also used to send a control signal to the error feedback controller according to the evaluation results, and adjust the distance between the laser three-dimensional scanning device and the measured object according to the evaluation result, after receiving the evaluation result fed back by the upper computer 105;

the upper computer 105 is configured to code and decode the laser lines in the image pairs taken by the stereoscopic image sensor 102A;

the upper computer 105 is also used to make a three-dimensional reconstruction for the feature points in the image pairs of the measured object and the laser lines reflected by the surface of the measured object;

the upper computer 105 is also used to register data of the three-dimensional laser lines in different frames into the same coordinate system to generate a shape-plane-point cloud, based on the location information and the feature points returned by the inertial sensor 102B.

The system above realizes precise synchronization and logic control of the multi-line array laser three-dimensional scanning system by a programmable gate array FPGA, employs a line laser array as the projection pattern light source, sends trigger signals to a stereoscopic image sensor, a inertial sensor and a line laser array by the programmable gate array FPGA, such that an upper computer receives image pairs taken by the stereoscopic image sensor, and codes, decodes as well as makes a three-dimensional reconstruction for the laser line array patterns in the image pairs, makes a three-dimensional reconstruction for the feature points on the surface of the measured object, and matches and aligns the three-dimensional feature points at different times, predicts and corrects the matching calculation with hybrid sensor locating technology for registering and stitching the time domain laser three-dimensional scanning data, meanwhile evaluates a real-time measurement error level and feeds it back to an error feedback controller to make an adjustment instruction, thereby the system accomplishes a laser three-dimensional scanning with low cost, high efficiency, high reliability and high accuracy.

The programmable gate array FPGA 101 is further configured to receive a preset pulse trigger signal and a preset exposure time sent by the upper computer 105, and send the first trigger signal to the line laser array and send the third trigger signal to the inertial sensor 102B respectively according to the preset pulse trigger signal, and send the second trigger signal to the stereoscopic image sensor 102A according to the preset exposure time.

Hereinafter, the functions of each part in the system above will be described in detail, respectively.

Figure 3:
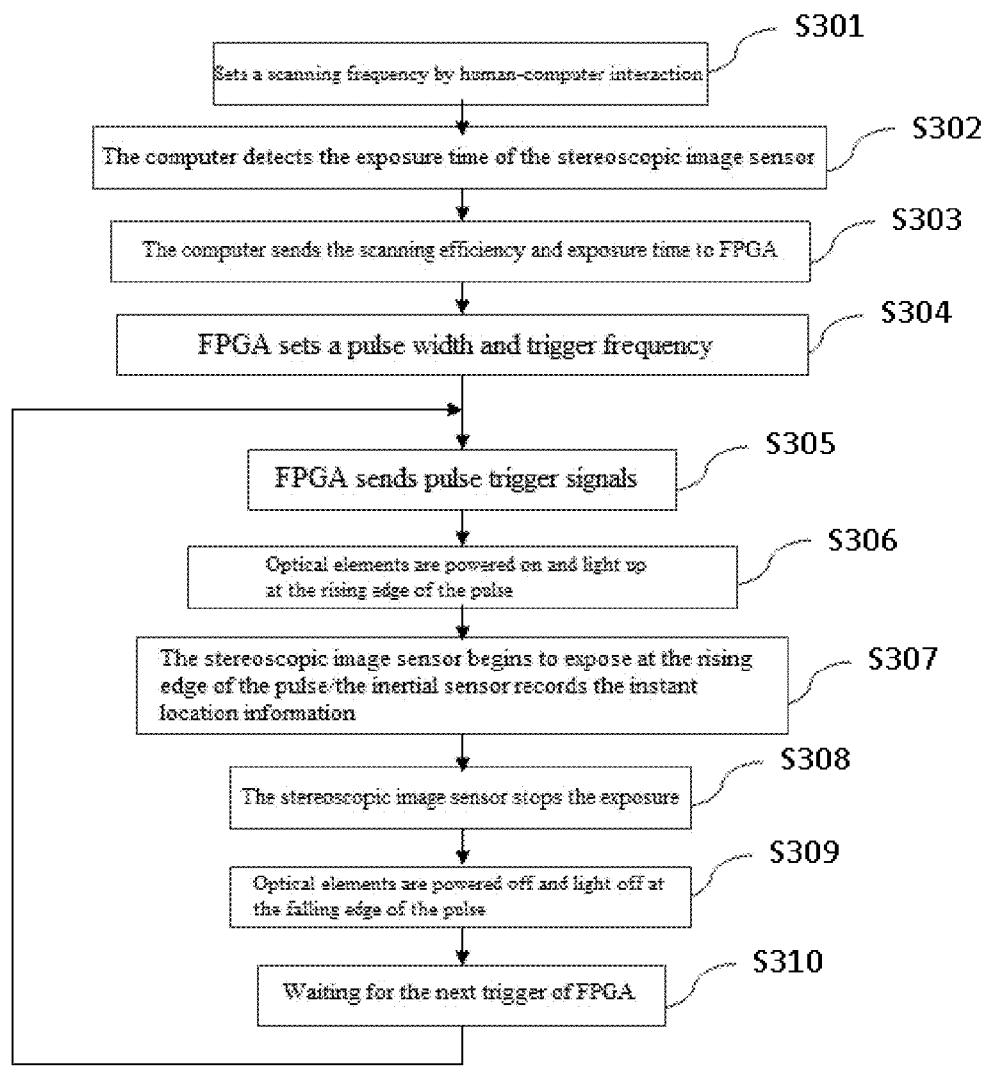
FIG. 3 is a flow schematic diagram of the working method of a programmable gate array FPGA provided by an embodiment of the present invention.

The programmable gate array FPGA 101 is coupled with the stereoscopic image sensor 102A, inertial sensor 102B, line laser array 103 and error feedback controller 104, respectively. FPGA 101 sends pulse trigger signals to the stereoscopic image sensor 102A, inertial sensor 102B and line laser array 103, precisely controlling the stroboscopic illumination of the line laser array 103, the synchronous shootings of the stereoscopic image sensor 102A and the obtaining for real-time location information of the inertial sensor 102B; FPGA 101 communicates with the upper computer, converting the measurement error evaluation levels fed back by the upper computer into logic signals so as to control the error feedback controller 104 to make adjustment instructions. The specific process of the precise synchronous control by FPGA 101 refers to FIG. 3. At S301, a scanning frequency is set by human-computer interaction via the upper computer; at S302, the upper computer communicates with the stereoscopic image sensor 102A to detect a preset image collection exposure time; at S303, the upper computer sends the exposure time above to FPGA 101; at S304, FPGA 101 sets a pulse signal output width and trigger output frequency according to the received exposure time and scanning frequency; at S305, FPGA 101 emits pulse trigger signals to the line laser array 103 and the stereoscopic image sensor 102A, respectively; at S306, optical elements (including auxiliary illumination sources that might be attached to the line laser array 103 and stereoscopic image sensor 102A, and the like) are energized and light up at the rising edge of the pulse signal; at S307, the stereoscopic image sensor 102A begins to expose at the rising edge of the pulse signal, meanwhile the inertial sensor 102B obtains real-time location information and returns it to the upper computer; at S308, the stereoscopic image sensor stops the exposure, and completes one collection for image pairs; at S309, optical elements are powered off and light off at the falling edge of the pulse; at S310, the hardware devices wait for the next trigger of FPGA 101 to circulate to S305.

The stereoscopic image sensor 102A is a multi-vision image sensor composed of two or more optical cameras, for example an optical camera 102A1 and an optical camera 102A2. The structures between the multiple optical cameras are relatively fixed, and the relative position relationship between the cameras and the internal parameters of the cameras are known. The multiple cameras receive the trigger pulse signal emitted from FPGA 101, and expose the collected images at the same time point. The multiple images collected each time constitute a set of three-dimensional matching image pairs, which are transmitted to the upper computer by a camera transmission cable to make a three-dimensional reconstruction. The stereoscopic image sensor 102A comprises an auxiliary illumination device 201 for increasing the intensity of the reflected light on the surface of the measured object collected by the image collection sensor. Alternatively, the stereoscopic image sensor 102A comprises an auxiliary illumination device for increasing the intensity of the reflected light on the surface of the measured object collected by the image collection sensor, for example, an annular LED light concentric with the outer circumference contour of the optical lens of the image collection sensor, and it is coupled with the camera through a signal input and output interface of the camera. The flash signal function outputted by the interface can control the LED light to carry out the stroboscopic work that is synchronous with the collection by the camera. For the convenience of explanation, the present embodiment takes a stereoscopic image sensor with dual cameras for an example. As illustrated in the structural schematic diagram of FIG. 2, the dual cameras are arranged in an upper and lower structure, and thus the camera above, for example optical camera 102A1 is referred to as an upper camera and the camera below, for example an optical camera 102A2 is referred to as a lower camera.

The inertial sensor 102B is configured to obtain the real-time location of the scanning device. The location information includes a displacement vector and a rotation Euler angle vector of the scanning device, which can be converted into a transformation relationship between the scanning data at different times, that is, [R|T], wherein R is a 3×3 rotation matrix, and T is a 3×1 displacement vector. Compared with the visual sensor which is susceptible to external factors so that locating error occurs, the advantage of the inertial sensor lies in that it is convenient and simple to obtain the location information of the device without relying on external factors such as the mark points and feature points on the surface of the measured object, thus the location information is not susceptible to external factors, which leads to errors, and it is relatively reliable to obtain rough location of the scanning device; However, since the location information obtained by the inertial sensor is less accurate than the location data obtained by optical measurement, particularly the displacement accumulation error is large, thus the position information cannot be used for data registration independently, but it is used to assist the subsequent hybrid sensor locating unit to make a more rapid and reliable data registration in combination with the accuracy advantage of optical locating.

The location information obtained by the inertial sensor 102B is based on the data of the coordinate system thereof, which cannot be used directly to substitute the location information of the scanning device in the global coordinate system. Therefore, it needs to calibrate the system for the scanning device, establish a mutual transformation relation between the inertial sensor, the visual sensor and the global coordinate system before the three-dimensional scanning, and calculate the transformation relation from the camera coordinate system to the global coordinate system by the location information of the inertial sensor during the three-dimensional scanning process. Take a plurality of images from different angles with a calibration board, record the roll angle and pitch angle outputted by the inertial sensor when each image is taken; define the global coordinate system, camera coordinate system, inertial sensor coordinate system and geomagnetic coordinate system; calculate the rotation matrix from the global coordinate system to the camera coordinate system based on the image information and spatial information of the calibrated objects in each image; combine the taken images in pairs, establish an equation set for the rotation matrix from the inertial sensor coordinate system to the camera coordinate system for each combination and solve it, calculate the rotation matrix from the inertial sensor coordinate system to the camera coordinate system; establish an equation set for the rotation matrix from the geomagnetic coordinate system to the global coordinate system for each image and solve it, calculate the rotation matrix from the geomagnetic coordinate system to the global coordinate system. During the three-dimensional scanning process, the rotation matrix from the camera coordinate system to the global coordinate system can be obtained in real time from the three calibrated transformation relations above.

The line laser array 103 is composed of a plurality of line lasers in a matrix arrangement, the positional relation between the line lasers is relatively fixed, and the positional relation between the laser array 103 and the stereoscopic image sensor 102A is relatively fixed. The line laser array 103 receives the pulse trigger signal sent by FPGA 101, it is powered on and lights up at the rising edge of the signal, powered off and lights off at the falling edge of the signal. The projection pattern on the surface of the measured object illuminated by the line laser array 103 is determined by the arrangement of the lasers. The arrangement of the plurality of line lasers may be varied, and different projection patterns can be projected by different structural arrangements, for example, a parallel arrangement, that is, the lasers are aligned in the direction of the laser line so that multiple laser lines emit in parallel, and the projection pattern is a set of parallel lines when the laser array projects vertically on a plane; a matrix type arrangement, the projection pattern is a set of gridlines when the laser array projects vertically on a plane; a random arrangement, that is, the projection pattern is a set of unordered straight line clusters when the laser array projects vertically on a plane. Wherein, the advantages of the matrix array lie in that a maximum number of laser line arrays can be obtained in limited device space so as to improve the scanning efficiency and facilitate the achievement of the subsequent laser line coding. Therefore, the present embodiment is exemplified by a matrix type laser arrangement, as illustrated in the component 103 in FIG. 2.

The error feedback controller 104 comprises a color changing LED light emitting device 202, a communication input interface and a communication output interface. The error feedback controller 104 receives the logic signal sent by FPGA 101 through the communication input interface, the LED light can emit lights of at least 5 kinds of colors based on the combination of three primary colors of red, green and blue, the lights of different colors represent indications of different working distances. The programmable gate array FPGA is configured to send the indication information of the three-dimensional scanning distance to the error feedback controller, so that the error feedback controller outputs an indicator light corresponding to the indication information based on the indication information. For example, when the indicator light shows green, it indicates that the working distance is within a reasonable range; when the indicator light shows other colors, it indicates that the working distance is not within a reasonable range, either too close or too far away. This indication can assist to adjust the working distance in real time during a manual operation. The upper computer is also provided with a communication interface 203, the communication interface is configured to communicate with a control device coupled with the upper computer, so as to make the control device to adjust the distance between the multi-line array laser three-dimensional scanning device and the measured object. The communication output interface feeds the working distance control information back to other automation control devices coupled to the system, for example, a robot, to instruct the robot to adjust the working distance between the portable scanning sensing device and the measured object so as to realize intelligent scanning.

The functions of laser line coding and decoding in the upper computer is for coding and decoding the group laser line patterns. Since the positional relation between the line laser array 103 and the stereoscopic image sensor 102A is relatively fixed, and the positional relation between the laser plane emitted from each laser and the stereoscopic image sensor 102A is also relatively fixed, the laser plane equation is unique and fixed in a coordinate system bound to the scanning sensing device. In the early system calibration process, the processor codes the laser plane where each laser line is located; in the three-dimensional scanning process, the processor codes each laser line by using the properties of the laser plane, so as to make each laser line have an unique code, which is used for a three-dimensional reconstruction for the laser lines that have a same code in the three-dimensional matching image pairs.

Figure 4:
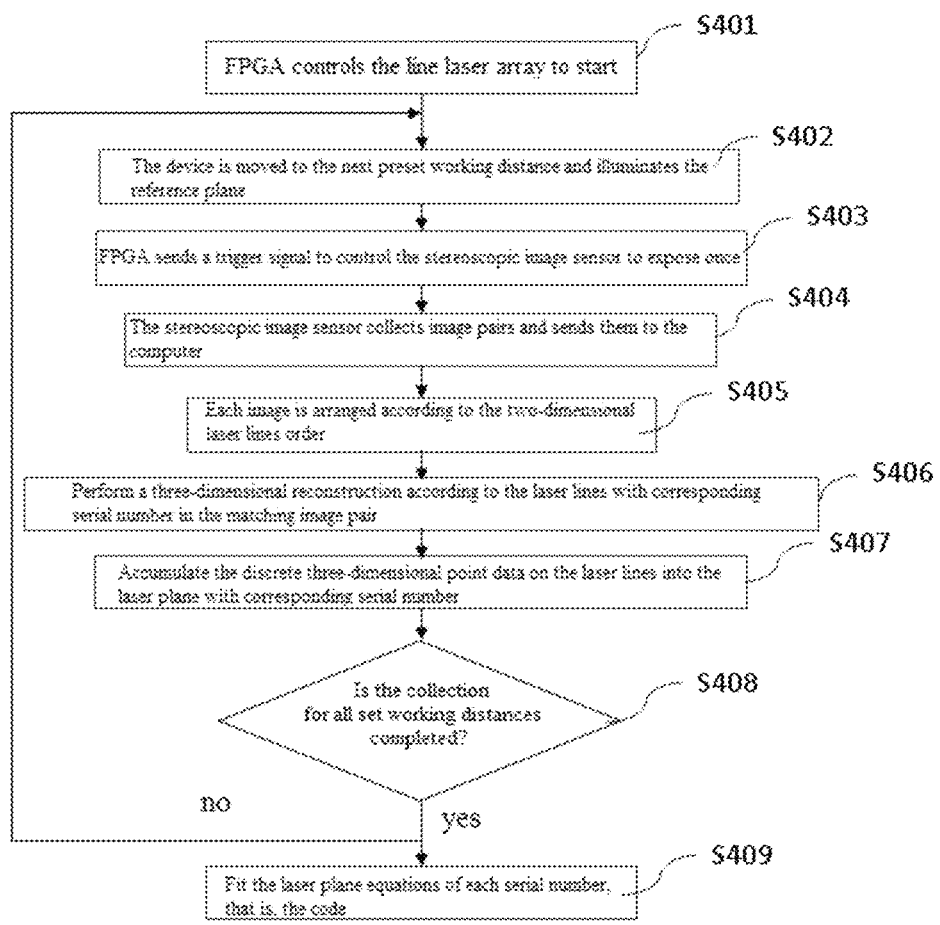
FIG. 4 is a flow schematic diagram of an coding method for a laser line array by an upper computer provided by an embodiment of the present invention.

The specific realization process of coding the laser line array is illustrated in FIG. 4: at S401, FPGA 101 controls the line laser array to start; at S402, the device is moved to the next preset working distance and the laser pattern is projected and illuminated on a reference plane, since the laser plane intersects with the reference plane in a straight line in the three-dimensional space, each laser line projected on the reference plane is a straight line; at S403, FPGA 101 sends a trigger signal to control the stereoscopic image sensor 102A to expose the collected image pairs once, and according to the optical lens imaging principle, the collimated laser line pattern on the reference plane is still a straight line when projected onto the imaging plane of the camera, that is, the laser line array pattern on the image is still a straight line cluster array; at S404, the stereoscopic image sensor 102A sends the collected image pairs to the upper computer; at S405, process each image respectively, extract all highlight pixels in the laser line center, separate and extract all laser lines according to the linear properties, and arrange the two-dimensional laser lines on the image according to the order from top to bottom and from left to right of the laser lines on the image; at S406, make a three-dimensional reconstruction for the laser lines in terms of the corresponding serial numbers in the matching image pairs according to the three-dimensional reconstruction calculating function in the upper computer; at S407, accumulate the discrete three-dimensional point data on the laser lines into the observation point set {P|pi(xi,yi,zi)} on the laser plane that has the corresponding serial number; at S408, determine whether all of the set working distances are collected; at S409, if it is determined that all of the set working distances are not collected, jump to S402 to enter the loop; if it is determined that all of the set working distances are collected, fit all laser plane equations. Generally, a spatial plane equation satisfies Ax+By+Cz+D=0, the three-dimensional observation point set {P|pi (xi, yi, zi)} on the spatial plane satisfies the plane equation, and the four equation coefficients of A, B, C and D can be solved by using the least squares method. Each laser plane has and only has one plane equation, whose serial number is the code of the laser plane.

The laser line array decoding is performed during the three-dimensional scanning process; each image is subjected to basic image processing and laser line segmentation according to the principle of continuity. In the image collection system with dual cameras, the discrete pixel points on each laser segment in the images of the upper camera correspond to one image point on the imaging plane of the upper camera in the three-dimensional space respectively, a half-line connecting the image point with the optical center of the upper camera intersects with the spatial laser plane to obtain a three-dimensional spatial point, the image point of the spatial point on the image of the lower camera is calculated according to the camera imaging principle. If the set of the corresponding pixel points found on the lower camera images with the method above by most of the discrete pixel points on a certain laser segment in the images of the upper camera is just on the same segment of a laser line, the two laser line segments of the upper camera and the lower camera are numbered and identified, wherein the number is the same as the number used by the laser plane. Normally, each laser line segment can find out the only corresponding laser plane and the code thereof by traversing all laser planes to conduct the calculation above.

The three-dimensional reconstruction calculation function in the upper computer is configured to make a three-dimensional reconstruction for the feature points on the surfaces of the objects in the image pairs collected by the stereoscopic image sensor 102A, and make a three-dimensional reconstruction for the laser lines reflected by the surfaces of the objects, that is, convert the set of two-dimensional feature points in the three-dimensional matching image pairs into a set of three-dimensional feature points based on the triangulation calculation method, and converts the two-dimensional laser lines with the same code in the three-dimensional matching image pairs into the three-dimensional spatial laser lines based on the triangulation calculation method. In the present embodiment, the surface feature of the object is a manually designed round mark attached to the surface of the object, and the ellipse center extracted from the image processing is the two-dimensional feature point on the image. According to the principle of epipolar geometry, for each feature point in the images of the upper camera, seek the nearest two-dimensional feature points on the epipolar line in the images of the lower camera, the three-dimensional spatial coordinates of the feature point can be calculated based on the corresponding two-dimensional feature point pair of the upper camera and lower camera according to the triangulation method. With respect to each of the laser points that have been decoded by the laser plane in the images of the upper camera, seek on the images of the lower camera the intersections between the epipolar line and the two-dimensional segments of the laser lines with the same code, the three-dimensional spatial coordinates of the laser point can be calculated based on the corresponding two-dimensional feature point pair of the upper camera and lower camera according to the triangulation method. The laser line is substantially a set of these laser points.

The function of hybrid sensor locating in the upper computer is configured to register the three-dimensional scanning data at each time t into the global coordinate system. Firstly, calculate a rough transformation relation from the current camera coordinate system to the global coordinate system, based on the position information at time t obtained by the inertial sensor and the fusion calibration results of the visual-inertial sensor mentioned above, the rough transformation relation is, [R0|T0], wherein R0 is a 3×3 rotation matrix, and T0 is a 3×1 displacement vector. The set of the feature points in the three-dimensional reconstruction within the camera coordinate system at time t is {P|pi(xi,yi,zi)}. The spatial coordinate XP of each three-dimensional feature point in the point set P is transformed into the global coordinate system by using the transformation relationship [R0|T0]. The nearest point in the set of feature points in the three-dimensional reconstruction before time t is sought within the domain of each transformed spatial coordinate values, so as to obtain the point set {Q|qi(xi,yi,zi)} corresponding to the global coordinate system. The point sets P and Q constitute a set of mapping relation, that is, the coordinate transformation. The transformation relation [R|T] satisfies RXP+T=XQ, wherein XP is the spatial coordinate vector in point set P, XQ is the spatial coordinate vector in point set Q, R is a 3×3 rotation matrix, T is a 3×1 translation vector, and the transformation relation [R|T] can be calculated by using the least square and quaternion method. It is noted that [R0|T0] and [R|T] actually describe the same transformation relation, but [R|T] which has been calculated via optical feature locating is more accurate compared to [R0|T0] which is calculated directly from the position of the inertial sensor; whereas, the meaning of [R0|T0] lies in that a sub-set matching with the set P of feature points in the three-dimensional reconstruction under the camera coordinate system at time t is found out rapidly and precisely in the set of feature points in the three-dimensional reconstruction under the global coordinate system before time t, avoiding the wrong matching for the matching and searching method of single optical feature point due to similar geometric features, thereby enhancing the reliability of scanning data registration. After obtaining the coordinate transformation relation [R|T], the three-dimensional spatial coordinates of all laser points reconstructed under the camera coordinate system can be transformed into the unified global coordinate system before time t, by calculating all the laser point set {M|mi(xi,yi,zi)} under the three-dimensional reconstruction at time t with RXM+T, and constitute the cloud data of point under the same coordinate system with the point set before time t. Lastly, the translation vector T is calculated back into the inertial sensor coordinate system by the inverse transformation of coordinate transformation, and the translation vector T0 under the inertial sensor coordinate system is modified, minimizing the cumulative error of the inertial sensor on displacement measurement, making a real-time self-calibration of the inertial sensor on displacement measurement.

The error evaluation and calculation function in the upper computer is configured to evaluate current measurement error level and feed the error level result back to FPGA through the communication interface between the upper computer and FPGA 101. The average distance from the spatial coordinates of all the feature points under the three-dimensional reconstruction at time t to the midpoint of the connection of the coordinates of the optical centers of the two cameras of the scanning sensing device (which is defined as the working distance of the device herein) is a consideration for evaluating measurement error level. When the working distance is within the range of the measured depth of field of the device, the error level is evaluated as 0, indicating reasonable; when the working distance is larger or smaller compared to the range of the depth of field, the error level is evaluated as +1 or −1, indicating the warning that the working distance should be adjusted; when the working distance is too large or too small compared to the range of the depth of field, the error level is evaluated as +2 or −2, indicating that the working distance has to be adjusted, otherwise the data is no longer updated and accumulated, so as to avoid affecting the entire data quality. Alternatively, the error evaluation and calculation unit 108 can also use the average distance between the spatial coordinates of all the laser points on the surface of the object under the three-dimensional reconstruction and the optical center of the device as the working distance to evaluate the measurement error level.

Figure 5:
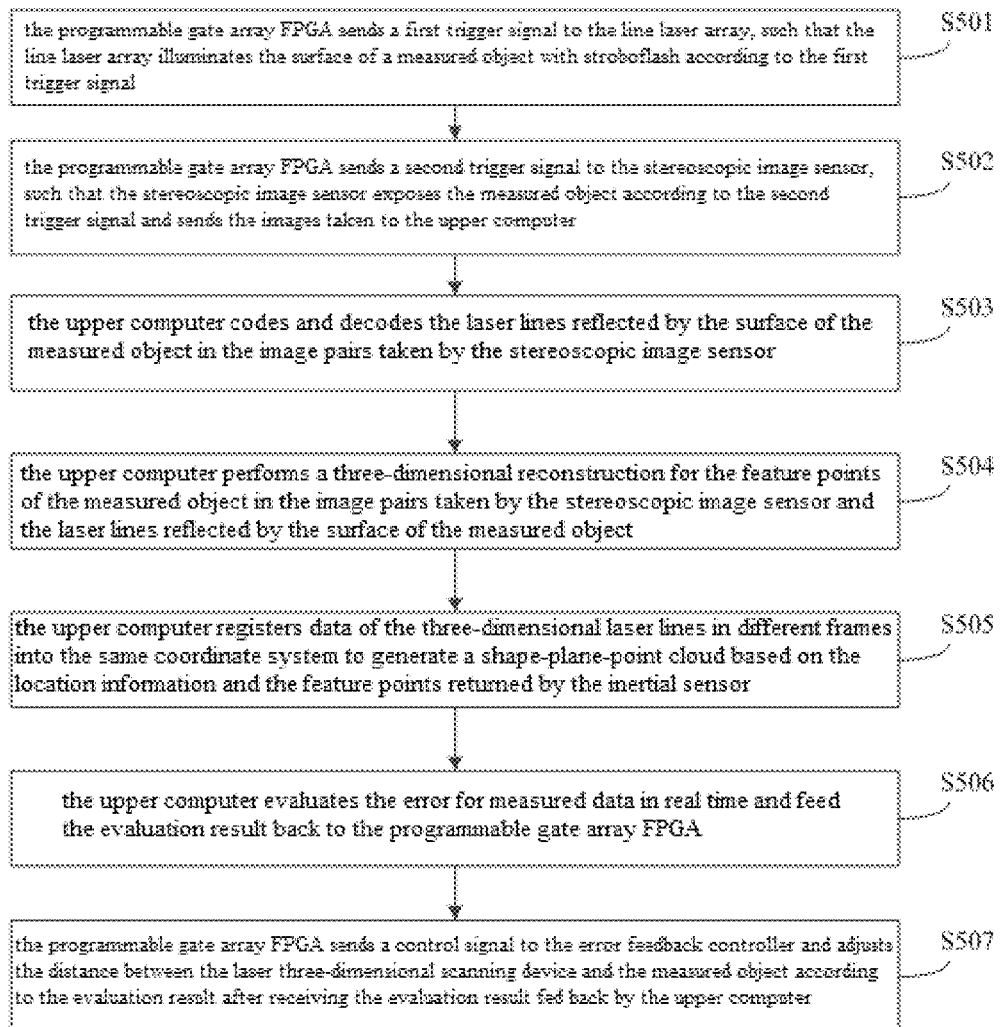
FIG. 5 is a flow schematic diagram of a three-dimensional scanning method based on the multi-line array laser three-dimensional scanning system provided by an embodiment of the present invention.

FIG. 5 illustrates a flow schematic diagram of a multi-line array laser three-dimensional scanning method based on the multi-line array laser three-dimensional scanning system above, as illustrated in FIG. 5, comprising:

S501, the programmable gate array FPGA sends a first trigger signal to the line laser array, such that the line laser array illuminates the surface of a measured object with stroboflash according to the first trigger signal;

S502, the programmable gate array FPGA sends a second trigger signal to the stereoscopic image sensor, such that the stereoscopic image sensor exposes the measured object according to the second trigger signal and sends the images taken to the upper computer;

S503, the upper computer codes and decodes the laser lines reflected by the surface of the measured object in the image pairs taken by the stereoscopic image sensor;

S504, the upper computer makes a three-dimensional reconstruction for the feature points of the measured object in the image pairs taken by the stereoscopic image sensor and the laser lines reflected by the surface of the measured object;

S505, the upper computer registers data of the three-dimensional laser lines in different frames into the same coordinate system to generate a shape-plane-point cloud based on the location information and the feature points returned by the inertial sensor;

S506, the upper computer evaluates the error for measured data in real time and feeds the evaluation result back to the programmable gate array FPGA;

S507, the programmable gate array FPGA sends a control signal to the error feedback controller and adjusts the distance between the laser three-dimensional scanning device and the measured object according to the evaluation result after receiving the evaluation result fed back by the upper computer.

Before step S501 above where the programmable gate array FPGA sends the first trigger signal to the line laser array, the method further comprises a step that is not illustrated in FIG. 5:

S500, the programmable gate array FPGA receives a preset exposure time and a preset pulse trigger signal sent by the upper computer, sends the first trigger signal to the line laser array according to the preset pulse trigger signal, and sends the second trigger signal to the stereoscopic image sensor according to the preset exposure time.

Figure 6:
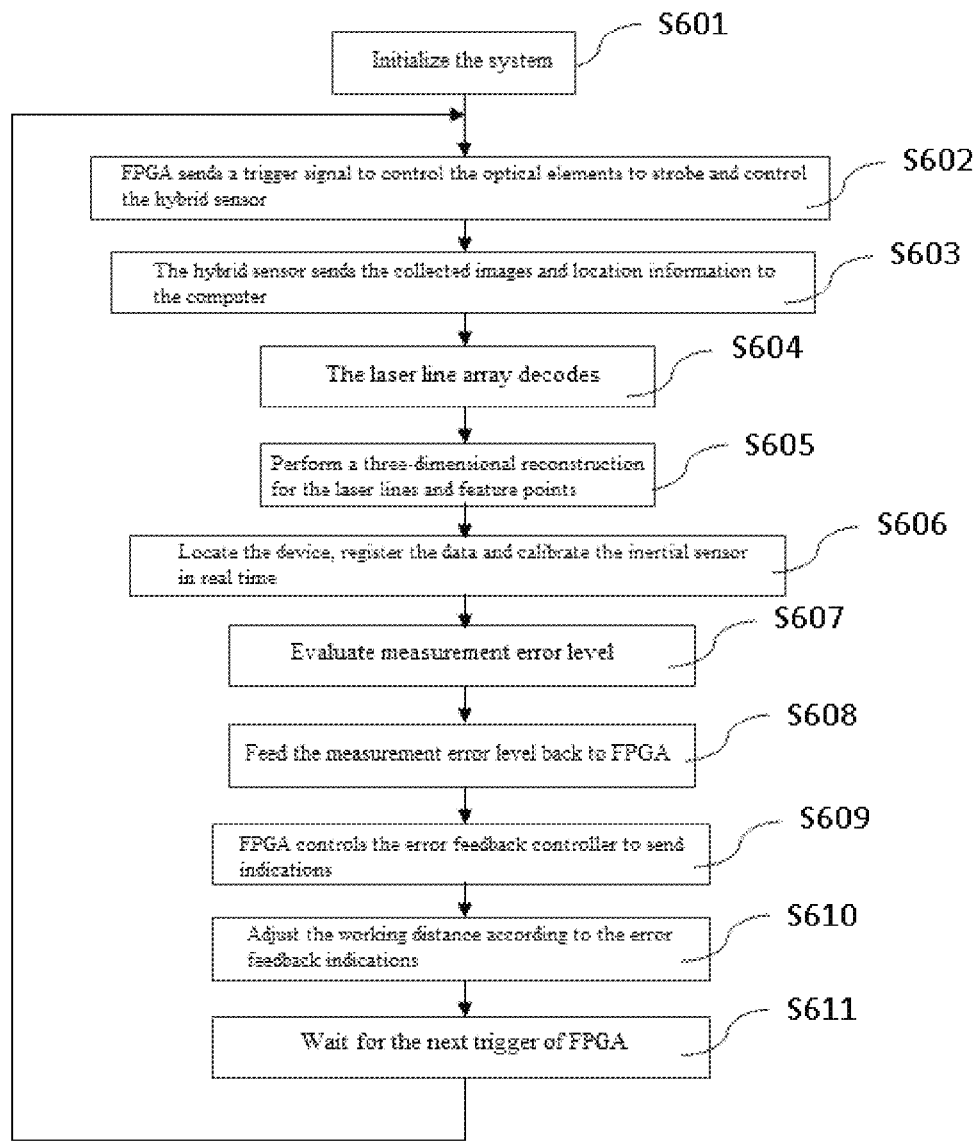
FIG. 6 is a flow schematic diagram of a three-dimensional scanning method based on the multi-line array laser three-dimensional scanning system provided by another embodiment of the present invention.

An overall realization process of the multi-line array laser three-dimensional scanning method of the present embodiment is illustrated in FIG. 6: at S601, the upper computer controls FPGA 101, visual-inertial hybrid sensor 102 (stereoscopic image sensor 102A and inertial sensor 102B) and the upper computer to start to enter working status; at S602, FPGA 101 sends a trigger signal to control the optical elements to strobe and control the stereoscopic image sensor 102A to start collecting image pairs with exposure, meanwhile to control the inertial sensor 102B to obtain the real-time location information; at S603, the inertial sensor 102B sends the real-time location information to the upper computer, and the stereoscopic image sensor 102A sends the collected image pairs to the upper computer; at S604, the upper computer decodes and marks the laser lines by the coding and decoding function of the laser line array, so as to identify the laser plane number for each segment of the laser lines on the images; at S605, the upper computer also makes a three-dimensional reconstruction for the laser lines and feature points by the calculating function of the three-dimensional reconstruction; at S606, the upper computer also performs spatial locating of the device, data registration and self-calibration of the inertial sensor by the function of hybrid sensor locating; at S607, the upper computer evaluates and calculates the measurement error level by the function of error level evaluation and calculation; at S608, the upper computer sends the error level to FPGA 101; at S609, FPGA 101 controls the error feedback controller 104 to send indications according to the error level; at S610, adjusting the working distance according to the indications of the error feedback controller; at S611, waiting for the next FPGA trigger signal, jumping to S602 to enter the loop.

A structural schematic diagram of the device under a working status of the present embodiment is illustrated in FIG. 2. The portable multi-line array laser three-dimensional scanning device is mainly composed of programmable gate array FPGA 101, visual-inertial hybrid sensor 102 (including stereoscopic image sensor 102A and inertial sensor 102B), line laser array 103 and error feedback controller 104. The line laser array 103 emits a set of laser planes, which project on the surface the measured object 501 to form a set of laser line array 502. The circular mark point 503 is a manual mark commonly used in optical three-dimensional scanning, for registering and stitching the data under multiple scans.

The scanning efficiency of the system above is significantly improved. Compared to single laser line scanning in the prior art, the data reconstruction rate is increased multiply by employing laser line array patterns. If the number of laser lines in an array is n, the amount of data reconstructed per unit time is n times that of single line scanning, that is, in the case where the scanning for the same amount of data is completed, the scanning time of laser line array is only 1/n of that of single line scanning. For example, the scanning efficiency of an array composed of 6 line lasers is about 6 times that of single line scanning, and the scanning time is shortened by 5/6.

The device cost is significantly decreased. The process of specially customized multi-line laser generator is complex, and its technology is monopolized by only a few companies, thus the cost is very high, typically, a laser of such laser scanning device costs tens of thousands RMB; however, if employing a single laser array, the cost of a laser array with the same amount of laser lines is only several hundreds of RMB, that is, the cost of the lasers part is saved by more than 95/100, and the cost of the entire scanning device is decreased by about 2/3 accordingly.

The service life is significantly increased. Limited by the processing speed of the image collection sensor, the effective exposure time of an image occupies about 1/10 of the total scanning time. Therefore, under the continuous scanning mode in the prior art, the main optical LED components (such as laser LED, etc.) have up to 9/10 ineffective working time. However, after employing a pulse stroboscopic scanning, the ratio of ineffective working time of the main optical LED components is reduced from 9/10 to 0. According to the nominal parameters of LED, it is estimated that the service life is increased by 10 times, the energy consumption is significantly reduced, the heat dissipation is almost negligible, meanwhile the design and manufacturing costs of heat dissipation structure is eliminated.

The scanning erroneous stitching rate is decreased, the reliability is improved. Compared with the existing single optical feature locating technology, employing visual-inertial hybrid sensor locating technology improves the reliability of feature points matching, avoids the wrong matching of optical features due to geometric similarity, thereby improving the correct rate of the stitching and registration of scanning data. Take scanning for an object with 200 locating reference mark points for an example. By carrying out experimental statistics for the two technologies which perform scanning 50 times respectively, it is found that the erroneous stitching rate which occurs in the single optical feature locating technology is about 50%, whereas the number of erroneous stitching that occurs in hybrid sensor locating technology is 0.

The scanning accuracy is significantly improved. According to the internationally authoritative German VDI-2634 optical three-dimensional measuring device accuracy testing standards, it is tested that after employing error evaluation and feedback control technology, the laser scanning accuracy is improved from 0.1 mm to 0.03 mm, which is about 3 times the original scanning accuracy.

The embodiments above are only used to explain the technical solutions of the present invention, and are not intended to be limiting thereto; although the present invention has been described in detail with reference to the foregoing embodiments, it should be understood by those of ordinary skills in the art that the technical solutions described in the foregoing embodiments may be modified or equivalently replaced with some of the technical features; while these modifications or replacements do not separate the essence of the corresponding technical solutions from the spirit and scope of the various embodiments of the present invention.

What is claimed is:

1. A multi-line array laser three-dimensional scanning system, wherein the system comprises: a multi-line array laser three-dimensional scanning device, comprising a programmable gate array FPGA, at least one stereoscopic image sensor, an inertial sensor, a line laser array and an error feedback controller, wherein the programmable gate array FPGA is coupled with the stereoscopic image sensor, the inertial sensor, the line laser array and the error feedback controller, respectively; and an upper computer is coupled with the programmable gate array FPGA, the stereoscopic image sensor and the inertial sensor, respectively; wherein the programmable gate array FPGA is configured to send a first trigger signal to the line laser array, such that the line laser array illuminates a surface of an object to be measured with stroboflash according to the first trigger signal;

the programmable gate array FPGA is further configured to send a second trigger signal to the stereoscopic image sensor, such that the stereoscopic image sensor performs exposure shootings to the object according to the second trigger signal and sends image pairs being taken to the upper computer;

the programmable gate array FPGA is further configured to send a third trigger signal to the inertial sensor, such that the inertial sensor sends location information of the multi-line array laser three-dimensional scanning device to the upper computer according to the third trigger signal;

the upper computer is further configured to perform a real-time error evaluation for measured data and feed an evaluation result back to the programmable gate array FPGA;

the programmable gate array FPGA is further configured to send a control signal to the error feedback controller according to the evaluation result, and adjust a distance between the laser three-dimensional scanning device and the measured object according to the evaluation result after receiving the evaluation result fed back by the upper computer;

the upper computer is configured to code and decode laser lines in the image pairs taken by the stereoscopic image sensor;

the upper computer is further configured to perform a three-dimensional reconstruction for feature points in the image pairs of the object and the laser lines reflected by the surface of the object;

the upper computer is further configured to register data of the three-dimensional laser lines in different frames into a same coordinate system to generate a shape-plane-point cloud based on the location information sent by the inertial sensor and the feature points in the image pairs.

2. The system of claim 1, wherein the programmable gate array FPGA is further configured to receive a preset pulse trigger signal and a preset exposure time sent by the upper computer, and send the first trigger signal to the line laser array and transmit the third trigger signal to the inertial sensor respectively according to the preset pulse trigger signal, and send the second trigger signal to the stereoscopic image sensor according to the preset exposure time.

3. The system of claim 1, wherein the error feedback controller is configured to receive the control signal sent by the programmable gate array FPGA, and output an indicator light corresponding to the control signal.

4. The system of claim 3, wherein the error feedback controller comprises a color changing LED to emit lights based on three primary colors of red, green and blue.

5. The system of claim 1, wherein the stereoscopic image sensor is a multi-vision image sensor composed of two or more optical cameras.

6. The system of claim 1, wherein the stereoscopic vision sensor is provided with an illumination device.

7. The system of claim 6, wherein an illumination time of the illumination device is synchronized with an exposure time of the stereoscopic sensor.

8. The system of claim 1, wherein the line laser array comprises a plurality of line lasers arranged in a matrix arrangement.

9. The system of claim 1, wherein the upper computer is configured to track the feature points, and register data of the three-dimensional laser lines in different frames into the same coordinate system by tracking homonymous feature points between adjacent time frames.

10. The system of claim 1, wherein the upper computer is further configured to evaluate the distance between the laser three-dimensional scanning device and the measured object in real time, and feed an evaluation result back to the programmable gate array FPGA when the distance exceeds a preset distance.

11. The system of claim 1, wherein the upper computer is also provided with a communication interface for communicating with a control device coupled with the upper computer, such that the control device adjusts the distance between the multi-line array laser three-dimensional scanning device and the measured object.

12. A multi-line array laser three-dimensional scanning method based on a multi-line array laser three-dimensional scanning system, wherein the system comprises a multi-line laser three-dimensional scanning device, comprising:

a programmable gate array FPGA, at least one stereoscopic image sensor, an inertial sensor, a line laser array and an error feedback controller, wherein the programmable gate array FPGA is coupled with the stereoscopic image sensor, the inertial sensor, the line laser array and the error feedback controller, respectively; and an upper computer is coupled with the programmable gate array FPGA, the stereoscopic image sensor and the inertial sensor, respectively; wherein the programmable gate array FPGA is configured to send a first trigger signal to the line laser array, such that the line laser array illuminates a surface of an object to be measured with stroboflash according to the first trigger signal;

the programmable gate array FPGA is further configured to send a second trigger signal to the stereoscopic image sensor, such that the stereoscopic image sensor performs exposure shootings to the object according to the second trigger signal and sends image pairs being taken to the upper computer;

the programmable gate array FPGA is further configured to send a third trigger signal to the inertial sensor, such that the inertial sensor sends location information of the multi-line array laser three-dimensional scanning device to the upper computer according to the third trigger signal;

the upper computer is further configured to perform a real-time error evaluation for measured data and feed an evaluation result back to the programmable gate array FPGA;

the programmable gate array FPGA is further configured to send a control signal to the error feedback controller according to the evaluation result, and adjust a distance between the laser three-dimensional scanning device and the measured object according to the evaluation result after receiving the evaluation result fed back by the upper computer;

the upper computer is configured to code and decode laser lines in the image pairs taken by the stereoscopic image sensor;

the upper computer is further configured to perform a three-dimensional reconstruction for feature points in the image pairs of the object and the laser lines reflected by the surface of the object;

the upper computer is further configured to register data of the three-dimensional laser lines in different frames into a same coordinate system to generate a shape-plane-point cloud based on the location information sent by the inertial sensor and the feature points in the image pairs, wherein the method comprises:

the programmable gate array FPGA sending the first trigger signal to the line laser array, such that the line laser array illuminates the surface of the measured object with stroboflash according to the first trigger signal;

the programmable gate array FPGA sending the second trigger signal to the stereoscopic image sensor, such that the stereoscopic image sensor exposes the measured object according to the second trigger signal and sends the image pairs taken to the upper computer;

the upper computer coding and decoding the laser lines reflected by the surface of the measured object in the image pairs taken by the stereoscopic image sensor;

the upper computer performing the three-dimensional reconstruction for the feature points of the measured object in the image pairs taken by the stereoscopic image sensor and the laser lines reflected by the surface of the measured object;

the upper computer registering data of the three-dimensional laser lines in different frames into the same coordinate system to generate the shape-plane-point cloud based on the location information sent by the inertial sensor and the feature points in the image pairs;

the upper computer evaluating the error for measured data in real time and feeding the evaluation result back to the programmable gate array FPGA;

the programmable gate array FPGA sending the control signal to the error feedback controller and adjusting the distance between the laser three-dimensional scanning device and the measured object according to the evaluation result after receiving the evaluation result fed back by the upper computer.

13. The method of claim 12, wherein before the programmable gate array FPGA sending the first trigger signal to the line laser array, the method further comprises:

the programmable gate array FPGA receiving a preset exposure time and a preset pulse trigger signal sent by the upper computer, sending the first trigger signal to the line laser array and transmitting the third trigger signal to the inertial sensor respectively according to the preset pulse trigger signal, and sending the second trigger signal to the stereoscopic image sensor according to the preset exposure time.

* * * * *